United States Patent
Homme

(10) Patent No.: US 7,087,908 B2
(45) Date of Patent: *Aug. 8, 2006

(54) SCINTILLATOR PANEL, RADIATION IMAGE SENSOR AND METHODS OF PRODUCING THEM

(75) Inventor: Takuya Homme, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 96 days.

This patent is subject to a terminal disclaimer.

(21) Appl. No.: 10/363,898

(22) PCT Filed: Sep. 11, 2001

(86) PCT No.: PCT/JP01/07884

§ 371 (c)(1),
(2), (4) Date: Mar. 10, 2003

(87) PCT Pub. No.: WO02/23219

PCT Pub. Date: Mar. 21, 2002

(65) Prior Publication Data

US 2004/0000644 A1    Jan. 1, 2004

(30) Foreign Application Priority Data

Sep. 11, 2000    (JP) ............................. 2000-275062
Sep. 11, 2000    (JP) ............................. 2000-275077

(51) Int. Cl.
G01T 1/20    (2006.01)
(52) U.S. Cl. ................. 250/483.1; 250/484.4
(58) Field of Classification Search ............. 250/483.1, 250/484.4, 368, 370.08, 370.09, 370.11, 367, 250/580, 581
See application file for complete search history.

(56) References Cited

U.S. PATENT DOCUMENTS

| | | | | |
|---|---|---|---|---|
| 4,906,850 A | * | 3/1990 | Beerlage | ................. 250/370.09 |
| 5,132,539 A | | 7/1992 | Kwasnick et al. | |
| 5,146,076 A | | 9/1992 | Raverdy et al. | |
| 5,179,284 A | * | 1/1993 | Kingsley et al. | ........ 250/370.11 |
| 5,187,369 A | * | 2/1993 | Kingsley et al. | ........ 250/370.11 |
| 5,208,460 A | | 5/1993 | Rougeot et al. | |
| 5,585,280 A | * | 12/1996 | Kwasnick et al. | ............. 438/69 |
| 5,864,146 A | * | 1/1999 | Karellas | ..................... 250/581 |
| 6,031,234 A | | 2/2000 | Albagli et al. | |
| 6,040,962 A | | 3/2000 | Kanazawa et al. | |
| 6,278,118 B1 | | 8/2001 | Homme et al. | |
| 6,469,307 B1 | | 10/2002 | Takabayashi et al. | |

(Continued)

FOREIGN PATENT DOCUMENTS

JP    59-500583    4/1984

(Continued)

*Primary Examiner*—Otilia Gabor
(74) *Attorney, Agent, or Firm*—Drinker Biddle & Reath LLP

(57) ABSTRACT

Scintillator panel (1) comprises a radiation transmitting substrate (5), which has heat resistance, a dielectric multilayer film mirror (6), as a light reflecting film and is formed on the radiation transmitting substrate (5), and a scintillator (10), disposed on the dielectric multilayer film mirror (6) and emits light by conversion of the radiation (30) that has been made to enter the radiation transmitting substrate (5) and has passed through the dielectric multilayer film mirror (6). Since the radiation transmitting substrate (5) has heat resistance, the dielectric multilayer film mirror (6) can be vapor deposited at a high temperature and, as a result, can be formed in a state of high reflectance. Also, unlike a metal film, the dielectric multilayer film mirror (6) will not corrode upon reacting with the scintillator (10).

15 Claims, 7 Drawing Sheets

U.S. PATENT DOCUMENTS

| | | |
|---|---|---|
| 6,531,225 B1 | 3/2003 | Homme et al. |
| 6,573,506 B1 | 6/2003 | Sato et al. |
| 6,608,312 B1 | 8/2003 | Okada et al. |
| 2002/0017613 A1 | 2/2002 | Homme et al. |
| 2002/0079493 A1* | 6/2002 | Morishita .................... 257/72 |

FOREIGN PATENT DOCUMENTS

| | | |
|---|---|---|
| JP | 4-501482 | 3/1992 |
| JP | 5-196742 | 8/1993 |
| JP | 5-203755 | 8/1993 |
| JP | 05-249299 | 9/1993 |
| JP | 11-160442 | 6/1999 |
| JP | WO99/66345 | 12/1999 |
| JP | WO099/66348 | 12/1999 |
| JP | WO00/63722 | 10/2000 |
| JP | 3130633 | 11/2000 |

* cited by examiner

SCINTILLATOR PANEL, RADIATION IMAGE SENSOR AND METHODS OF PRODUCING THEM

TECHNICAL FIELD

This invention relates to a scintillator panel to be used for radiation imaging for medical use, etc., a radiation image sensor that makes use of this scintillator panel, and methods for making these items.

BACKGROUND ART

Radiation image sensors, which convert radiation into electrical signals and enable electrical processing of the signals, are used widely in medical and industrial fields. The acquired electrical signals can be processed electrically and displayed on a monitor. A representative example of such a radiation image sensor is a radiation image sensor that uses a scintillator material for converting radiation in to light. With this type of radiation image sensor, an image pickup device, for further conversion of the converted light into electrical signals, is used in combination. For example, a MOS type image sensor, etc., is used as the image pickup device. For use in medical fields and non-destructive inspections (especially inspections using a micro-focused X-ray source, etc.), the irradiation dose of radiation is limited, and thus a radiation image sensor of high sensitivity that enables a high optical output with the limited irradiation dose is desired.

FIG. 9 is a longitudinal sectional view of a radiation image sensor described in International Patent Publication No. WO99/66345 (referred to hereinafter as "Prior Art 1"). To form this radiation image sensor 4, a scintillator panel 8, comprising a substrate 50, a light reflecting film 60, formed on the substrate 50, and a scintillator 10, formed on the light reflecting film 60, is combined with an image pickup device 20, which is disposed so as to face the scintillator 10. Radiation 30 enters from the substrate 50 side, passes through the light reflecting film 60, and is converted into light at the scintillator 10. The light resulting from conversion is received by the image pickup device 20 and converted into electrical signals. The light reflecting film 60 has a function of reflecting the light emitted by the scintillator 10 and returning this light to the scintillator 10 side to thereby increase the amount of light entering the light receiving part of the image pickup device 20. A film of metal, such as aluminum, etc., is mainly used as the light reflecting film 60.

FIG. 10 is a longitudinal sectional view of a radiation imaging device described in JP 5-196742A (referred to hereinafter as "Prior Art 2"). This radiation imaging device 3 comprises a substrate 51, a light detector 21, which is disposed on the substrate 51 and serves as an image pickup device, a scintillator 10, formed on the light detector 21, a thin film 41, disposed on the scintillator 10, a light reflecting film 70, formed on the thin film 41, and a moisture sealing layer 42, formed on the light reflecting film 70. This arrangement differs largely from that of the Prior Art 1 in that the light detector 21 is used as a base member for fixing and supporting the scintillator 10 and the light reflecting film 70 is formed above the scintillator 10 across the thin film 41. The thin film 41 is formed of an organic or inorganic material and absorbs the non-uniformity on the scintillator 10 to make the light reflecting film 70 uniform in reflectance. This publication indicates that a dielectric multilayer film, arranged from $TiO_2$ and $SiO_2$, etc., which differ mutually in optical refractive index, may be used as the light reflecting film 70.

DISCLOSURE OF THE INVENTION

These prior-art radiation image sensors has the following problems. That is, with the Prior Art 1, though a metal film is used as the light reflecting film 60, in many cases, this metal film 60 reacts with the scintillator 10 and undergoes corrosion. Such corrosion becomes significant especially in a case where CsI (T1) is used as the scintillator 10.

With the Prior Art 2, a dielectric multilayer film is used as light reflecting film 70, and since the scintillator 10 has a structure wherein a plurality of microscopic, columnar crystals, each with a diameter of approximately several µm to several dozen µm, are arranged in the form of bristles and thus has minute unevenness on the surface, it is difficult to directly form the dielectric multilayer 70 on such an uneven surface. The thin film 41 is thus interposed to flatten this unevenness. In order to form the dielectric multilayer film 70 to a state in which it is provided with a high reflectance, vapor deposition must be performed upon heating the base on which the multilayer film is to be formed to approximately 300° C. However, it is difficult to even simply apply a high temperature in a case where the thin film 41 is an organic film. Though it is possible to form a multilayer film at a temperature of no more than 300° C., it is difficult to control the thickness of the film that is formed and the problem that the dielectric multilayer film 70 becomes formed in a colored state occurs, causing the reflectance to drop and the optical output to decrease. In a case where the thin film 41 is formed of an inorganic film, it is difficult to form a flat surface for forming the multilayer film on the scintillator with an inorganic film, and as a result, the dielectric multilayer film becomes uneven on the surface (reflecting surface) and cannot be provided with high reflectance.

Thus an object of this invention is to provide a scintillator panel and a radiation image sensor, which a excellent in corrosion resistance and yet can provide a high optical output, and methods for making such a scintillator panel and radiation image sensor.

In order to achieve the above object, a scintillator panel according to the present invention is characterized in comprising: a heat-resistant substrate; a dielectric multilayer film mirror, deposited on the heat-resistant substrate; a scintillator, deposited so as to arrange a plurality of columnar structures on the dielectric multilayer film mirror and converting incident radiation into light; and a protective film, covering at least the scintillator; and wherein the dielectric multilayer film mirror reflects light emitted from the scintillator and returns this light toward the scintillator.

Since the dielectric multilayer film mirror is formed on the heat-resistant substrate, it is not necessary to form a thin film etc. for making the reflectance uniform in a case where the dielectric multilayer film mirror is formed on the scintillator, such as a film that absorbs the non-uniformity on the scintillator. And since the substrate is heat resistant, vapor deposition at a high temperature can be performed to enable the forming of a dielectric multilayer film mirror of high reflectance.

Furthermore, the substrate may be a radiation transmitting substrate and the scintillator may emit light by conversion of the radiation that has passed through the dielectric multilayer film mirror. In this case, the scintillator preferably has CsI or NaI as the main component. The scintillator may also be photostimulable phosphor.

The protective film is preferably an organic film. In this case, the protective film does not need to be formed at a high temperature and thus is readily formable.

As the dielectric multilayer film mirror, a multilayer film having laminated structure with alternating $TiO_2$ or $Ta_2O_5$ and $SiO_2$ layers is preferably adopted. This is because in the case of $TiO_2$ or $Ta_2O_5$ and $SiO_2$, corrosion upon reaction with the scintillator, which occurs with a metal reflecting film, will not occur and good reflection characteristics can be obtained over a wide wavelength range.

A separation preventing layer, which prevents the separation of the scintillator from the dielectric multilayer film mirror, is preferably disposed between the dielectric multilayer film mirror and the scintillator. The separation preventing layer may be a polyimide layer.

A radiation image sensor according to the present invention comprises: the above-described scintillator panel; and an image pickup device, disposed so as to face the scintillator panel and converting the light emitted by the scintillator to electrical signals. A radiation image sensor provided with a scintillator panel of good corrosion resistance and high reflectance, can thus be realized to enable the light emitted by this scintillator panel to be processed electrically and displayed on a monitor, etc.

Furthermore, by providing a light-absorbing housing that covers the scintillator panel, the generation of stray light due to scattering of the light that has passed through the dielectric multilayer film mirror and the generation of noise due to the entry of extraneous light can be restrained to enable to a high S/N ratio and high resolution to be achieved. This housing is preferably made of polycarbonate and its inner surface is preferably matte furnished.

Furthermore, putting the scintillator panel into adhesion with the image pickup device by means of fixing jigs is even more preferable as this will restrain the leakage of light and the occurrence of cross-talk.

A method of making a scintillator panel according to the present invention comprises the steps of: preparing a heat-resistant substrate; repeatedly depositing a dielectric film of desired thickness onto the substrate to form a dielectric multilayer film mirror with predetermined reflection characteristics; depositing columnar structures of a scintillator on the dielectric multilayer film mirror; and coating the scintillator with a protective film.

A method for making a radiation image sensor according to the present invention further comprises a step of positioning an image pickup device so as to face the scintillator manufactured by the abovementioned steps. A step of covering the scintillator panel with a light-absorbing housing may also be provided.

The scintillator panel and radiation image sensor according to the present invention can be made favorably by these making methods.

BEST MODES FOR CARRYING OUT THE INVENTION

Favorable embodiments of this invention shall now be described in detail with reference to the attached drawings. To facilitate the comprehension of the explanation, the same referring numerals denote the same parts, where possible, throughout the drawings, and a repeated explanation will be omitted.

Figure 1:
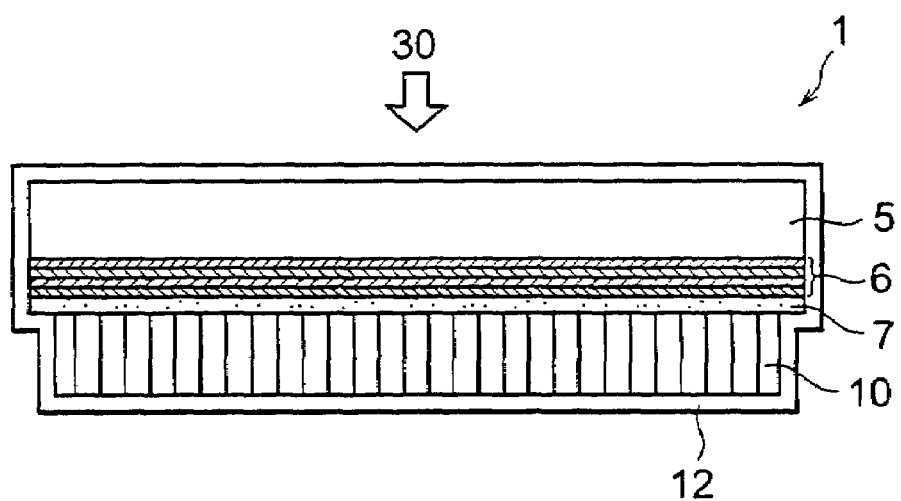
FIG. 1 is a longitudinal sectional view of a first embodiment of a scintillator panel according to the present invention.

FIG. 1 is a longitudinal sectional view of a first embodiment of a scintillator panel according to the present invention. The scintillator panel 1 comprises a Pyrex glass substrate 5 as a radiation transmitting substrate with heat resistance, a dielectric multilayer film mirror 6, formed on the Pyrex glass substrate 5, a polyimide layer 7, formed on the dielectric multilayer film mirror 6 as a separation preventing layer, and a scintillator 10, formed on the polyimide layer 7 and emitting light converted from the radiation 30 that has entered the Pyrex glass substrate 5 and has passed through the dielectric multilayer film mirror 6 and the separation preventing layer 7. The scintillator 10 has a structure wherein a plurality of microscopic columnar crystals, each with a diameter of a few μm to a few dozen μm, are arranged in the from of bristles. The entirety of these is covered by a polyparaxlylene film 12 as a protective film. A thin film of SiN, etc., may be provided between the Pyrex glass substrate 5 and the dielectric multilayer film mirror 6. This thin layer is useful to make the glass substrate surface a uniform, clean surface. As the dielectric multilayer film mirror 6, for example a multilayer film, wherein $TiO_2$ and $SiO_2$, which differ mutually in optical refractive index, are alternately laminated repeatedly a plurality of times, is used, and this film mirror acts as a light reflecting film that reflects and amplifies the light emitted by the scintillator 10. T1-doped CsI is used for example for the scintillator 10.

When a scintillator, having a structure wherein a plurality of columnar crystals are arranged in the form of bristles, is to be formed, a base member that fixes and supports the scintillator is necessary, in the present embodiment, the Pyrex glass substrate 5 is used as the base member that fixes and supports the scintillator 10. Though it is possible to form the scintillator 10 using an image pickup device as the base member, in this case, the image pickup device will be subject to heat repeatedly in the process of forming the scintillator 10 as well as in the process of forming the dielectric multilayer film mirror 6 and can thus become damaged. According to the present embodiment, since the scintillator 10 is formed on the Pyrex glass substrate 5, such a problem is resolved. Also, since this Pyrex glass substrate 5 is heat resistant, vapor deposition at a high temperature close to 300° C. is enabled and this enables the dielectric multilayer film mirror 6 to be formed to a state wherein it has a high reflectance.

Also, the dielectric multilayer film is excellent in corrosion resistance and thus will not corrode upon reacting with the scintillator 10 as in the case of a metal film. The corrosion in the case of a metal film is considered to corrosion of the metal film by Tl in the CsI with the moisture ingress into the interior of the scintillator panel and this required devising a structure for preventing the moisture ingress into the panel interior. However, according to the present embodiment, this requirement is eliminated by the use of the dielectric multilayer film mirror 6 of high corrosion resistance.

Furthermore, since the polyimide layer 7 is provided as a separation preventing layer between the dielectric multilayer film mirror 6 and the scintillator 10, the separation of the scintillator 10 from the dielectric multilayer film 6, which may occur when the thickness of the scintillator 10 is increased (especially to 400 μm or more), is prevented.

Figure 2A:
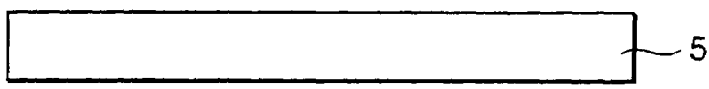
FIG. 2A to FIG. 2F are diagrams for explaining the steps for making the scintillator panel of FIG. 1.
Figure 2B:
Figure 2C:
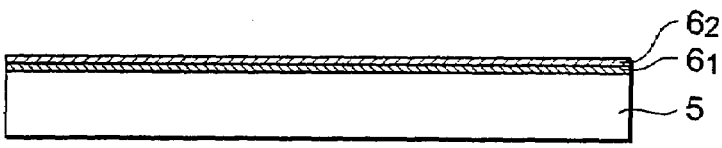
Figure 2D:
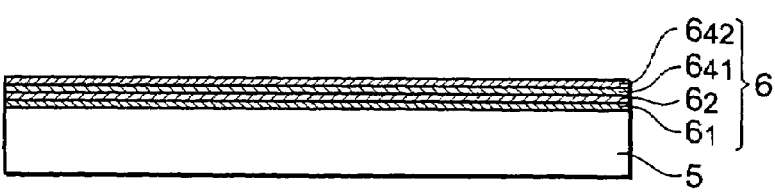

The steps for making this scintillator panel 1 shall now be described. First, as the radiation transmitting substrate 5, a Pyrex glass substrate 5 of 20 cm square and 0.5 mm thickness is prepared (see FIG. 2A), and $TiO_2$ $6_1$, $6_3$, ... $6_{41}$ and $SiO_2$ $6_2$, $6_4$, ... $6_{42}$ are laminated alternately and repeatedly onto this Pyrex substrate 5 by vacuum vapor deposition (see FIG. 2B and FIG. 2C) to form a dielectric multilayer film mirror 6 comprising a total of 42 layers (total thickness: approximately 4 μm) (see FIG. 2D). By controlling the film thickness of each layer, a predetermined reflectance for a predetermined wavelength range can be secured for the dielectric multilayer film mirror 6 as a whole.

Figure 2E:
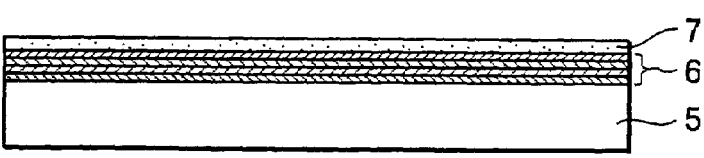
Figure 2F:
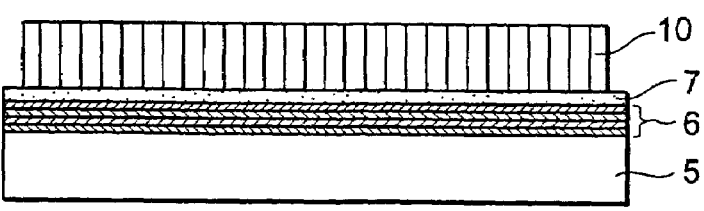

As the radiation transmitting substrate 5, besides a Pyrex glass substrate, an amorphous carbon plate or an aluminum plate may be used. In the case of an aluminum plate, the dielectric multilayer film mirror 6 is formed after performing sandblasting using glass beads (#1500) to remove rolling scars on the aluminum surface. On the dielectric multilayer film mirror 6, a highly transparent polyimide layer (for example, type name RN-812, made by Nissan Chemical Industries, Ltd.), as a separation preventing layer 7, is cured and then coated to a film thickness of 1 μm by spin coating (see FIG. 2E). Thereafter, columnar crystals of CsI of a thickness of 300 μm are formed by vapor deposition as a scintillator 10 on the polyimide layer 7 (see FIG. 2F). Then in order to flatten foreign matter and anomalous growth parts on the CsI surface, a glass plate is placed on the CsI surface and pressure is applied at a force of 1 atmosphere. Lastly, a polyparaxylylene film 12 of 10 μm thickness is formed by CVD as a protective film that covers the entirety, and the scintillator panel 1 shown in FIG. 1 is thus formed.

In a case where a scintillator panel 1 with a large area of 30 cm square or more is to be formed, the polyimide layer 7 is formed to a thickness of 1 μm and screen printing is used as the coating method. Also in order to improve the luminance in accompaniment with the increased size, the scintillator 10 is made 500 μm in the thickness.

Figure 3:
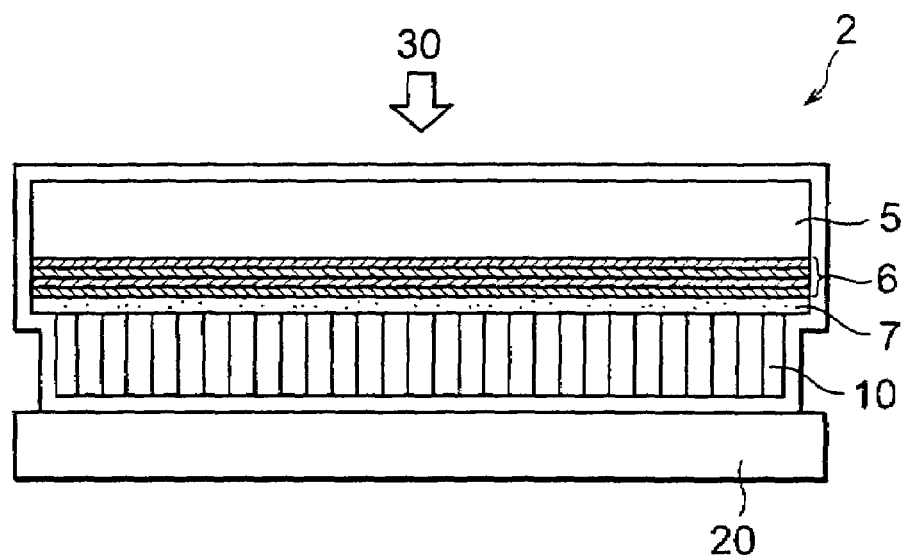
FIG. 3 is a longitudinal sectional view of a first embodiment of a radiation image sensor according to the present invention.

FIG. 3 is a longitudinal sectional view of a radiation image sensor 2 according to the present invention. This radiation image sensor 2 is arranged by combining an image pickup device 20 with the scintillator 10 of the scintillator panel 1 shown in FIG. 1 by positioning the image pickup device 20 so as to face the scintillator 10. The image pickup device 20 converts the light emitted by the scintillator 10 into electrical signals. For example, a MOS type image sensor having two-dimensionally aligned Si photodiodes is used as the image pickup device 20.

Figure 4:
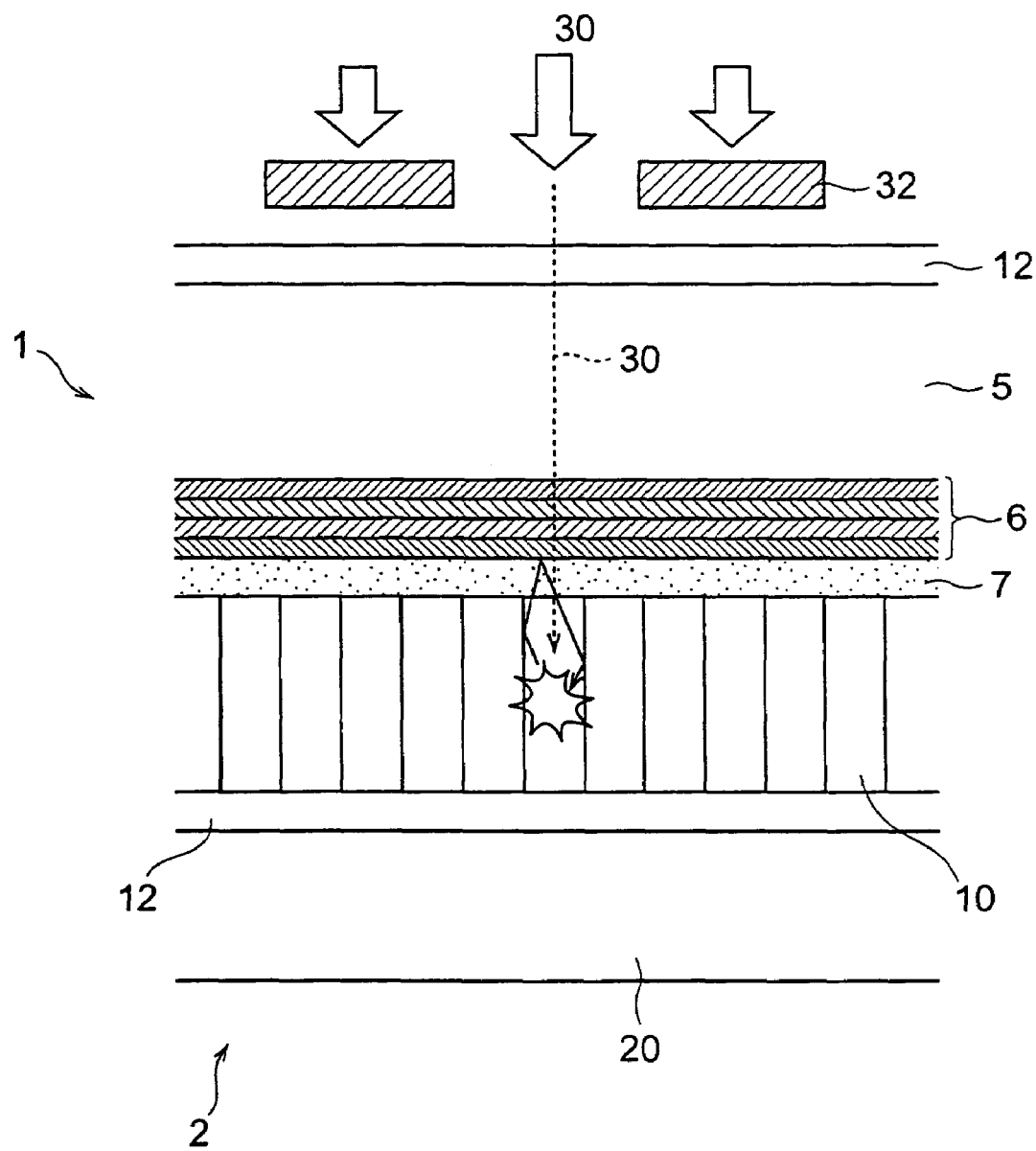
FIG. 4 is an enlarged sectional view for explaining the operation of the radiation image sensor of FIG. 3.

FIG. 4 is an enlarged sectional view for explaining the operation of the radiation image sensor 2. Radiation 30, which has not been blocked by or has been transmitted through a subject 32, passes through the polyparaxylylene film 12, Pyrex glass substrate 5, dielectric multilayer film mirror 6, and polyimide layer 7 and enters the scintillator 10. The scintillator 10 converts the incident radiation 30 into light and emits this light. Part of the light emitted from the scintillator 10 proceeds towards the dielectric multilayer film mirror 6 and this light is reflected by the dielectric multilayer film mirror 6 and is returned to the scintillator 10. Most of the light that is emitted is thus directed towards and received by the image pickup device 20. The image pickup device 20 converts the received light image information into electrical signals and outputs these signals. The electrical signals that are thus output are sent to and displayed on a monitor, etc., as image signals, and since the image here is one resulting from the conversion of a radiation image that entered the radiation image sensor 2 into a light image by the scintillator 10 and further conversion into electrical image signals by the image pickup device 20, it corresponds to being the subject 32's radiation image that entered the image sensor.

As described above, since the dielectric multilayer film mirror 6 of this embodiment has a high reflectance, the scintillator panel 1 and the radiation image sensor 2 that use this dielectric multilayer film mirror 6 are high in optical output.

In order to evaluate the sensitivity to radiation 30 and the corrosion resistance of the radiation image sensor 2 having the scintillator panel 1 prepared in the above-described manner, three samples (referred to respectively as "Examples 1 to 3") were prepared as examples of this invention and two samples (referred to respectively as "Prior-Art Examples 1 and 2") of the prior-art type radiation image sensors were prepared with respectively different arrangements. Table 1 shows the arrangements of these samples.

TABLE 1

Arrangements of the compared samples

| | Arrangement | | |
|---|---|---|---|
| Sample | Substrate | Light reflecting film | Separation preventing layer |
| Prior-Art Example 1 | Pyrex glass | Aluminum film | None |
| Prior-Art Example 2 | Amorphous carbon | Silver film | |
| Example 1 | Pyrex glass | | |
| Example 2 | Amorphous carbon | Dielectric multilayer film | Polyimide |
| Example 3 | Aluminum plate | | |

With each of the samples, CsI was used for the scintillator, a polyparaxylylene film was used as the protective film, and C-MOS was used for the image pickup device.

As a test for evaluating the sensitivity with respect to radiation 30, a fixed amount of radiation 30 was irradiated onto each of the samples and the optical output values were measured. As a test for evaluating the corrosion resistance, a shelf test over several days was conducted on just the scintillator panels from which the image pick devices 20 had been removed. The results of these tests are shown in Table 2. The optical output values are indicated as relative values with that of the Prior-Art Example 1 being set to 100%.

TABLE 2

Test Results of the Samples

| Sample | Relative output value | Corrosion resistance |
|---|---|---|
| Prior-Art Example 1 | 100% | The Al film corroded upon being left for 1 to 2 days under 40° C. air temperature and 90% humidity. |
| Prior-Art Example 2 | 140% | The Ag film corroded upon being left for 1 to 2 days under room temperature and room humidity. |
| Example 1 | 140% | No changes. |
| Example 2 | 130% | No changes. |
| Example 3 | 135% | No changes. |

Each of the Examples 1 to 3 were higher in optical output value than the Prior-Art Example 1 in which an aluminum film is used as the light reflecting film and was approximately equal in optical output value to the Prior-Art Example 2 in which a silver film is used. With regard to the corrosion resistance test, whereas corrosion occurred in 1 to 2 days with the Prior-Art Examples 1 and 2 that use metal films, changes were not seen with the Examples 1 to 3 that use dielectric multilayer film mirrors 6.

Also, the following test was conducted in order to check the effects of separation preventing layer 7. As samples, ten Pyrex glass (PX) substrates of 50 mm square and 1 mm thickness, each having 27 layers of the dielectric multilayer film mirror laminated thereon, were prepared. From each of these samples, five samples with polyimide layer 7 being coated onto the dielectric multilayer film mirror 6 as the separation preventing layer and five samples without coating were prepared, and with all samples, scintillator CsI was deposited. With each sample, ten layers of CsI were deposited, and the thickness was varied in five stages. The number of samples for which the separation of CsI occurred was examined.

TABLE 3

Occurrence of separation of CsI with respect to thickness of CsI and existence of polyimide layer

| Thickness of CsI | 100 μm | 200 μm | 300 μm | 400 μm | 500 μm |
|---|---|---|---|---|---|
| Without polyimide layer | 0/10 | 0/10 | 0/10 | 3/10 | 8/10 |
| With polyimide layer | 0/10 | 0/10 | 0/10 | 0/10 | 0/10 |

As indicated clearly in Table 3, whereas in the case of samples that do not use the polyimide layer 7 on the dielectric multilayer film mirror 6, separation began to occur at the point at which the thickness of the CsI exceeded 400 μm, separation of CsI was not seen with samples using the polyimide layer 7. This test also showed that in a case where the scintillator 10 is doped with T1 in the form of CaI (T1) or NaI(T1), the polyimide layer 7 simultaneously prevents the problem that the T1 diffuses slightly into and colors the dielectric multilayer film mirror 6 in the process of forming the scintillator by vapor deposition.

The above test results confirm that this embodiment's scintillator panel 1 and radiation image sensor 2 output a high optical output, are excellent in corrosion resistance, and also exhibit the effect of prevention of separation of the scintillator.

Other embodiments of this invention's scintillator panel and radiation image sensor now be described in detail.

Figure 5:
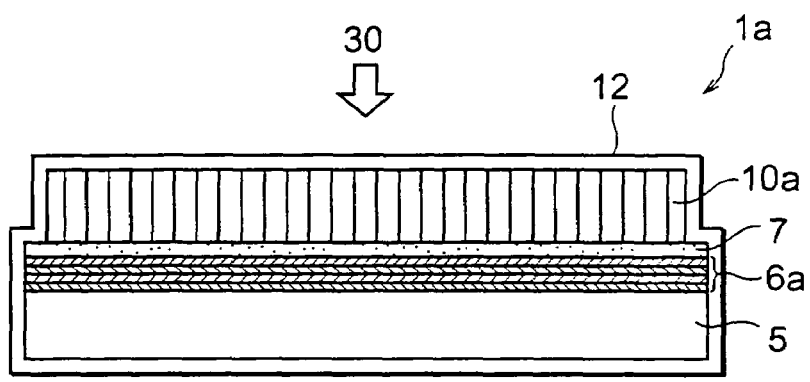
FIG. 5 and FIG. 6 are longitudinal sectional views for explaining a second embodiment of a scintillator panel according to the present invention.

FIG. 5 is a longitudinal sectional view, showing a second embodiment of a scintillator panel according to the present invention. This scintillator panel 1*a* has nearly the same arrangement as the scintillator panel 1 of the first embodiment shown in FIG. 1. The differences are that a dielectric multilayer film mirror 6*a*, formed by laminating $Ta_2O_5$/$SiO_2$, which has a high reflectance for light from the visible light to the ultraviolet range, is used and a so-called photostimulable phosphor of CsBr : Eu, etc., is used as scintillator 10*a*.

Figure 6:
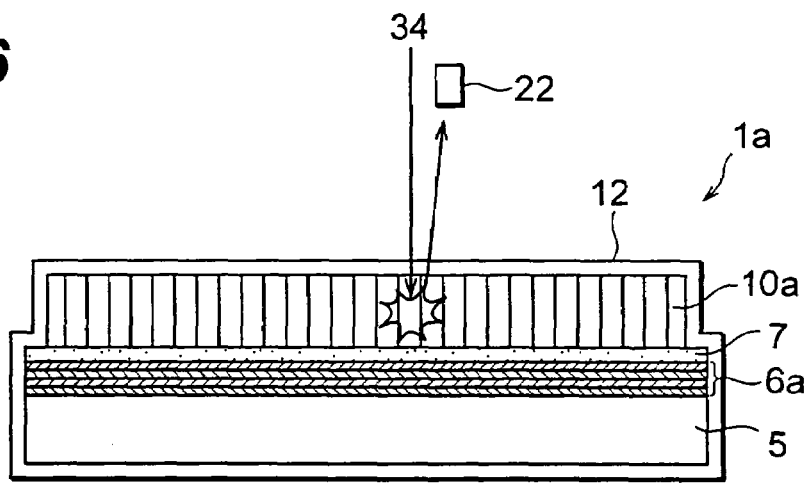

Unlike the scintillator panel 1 shown in FIG. 1, this scintillator panel 1*a* is used by irradiating radiation 30 from the scintillator 10*a* side. The scintillator 10*a* is excited by the radiation that enters in such a manner. Thereafter, by scanned illumination of a He-Ne laser beam 34 across the scintillator 10*a* as shown in FIG. 6, light that is in accordance with the amount of the irradiated radiation 30 is emitted from the scintillator 10*a*. This emitted light is detected by light detector 22 and converted into electrical signals to enable the acquisition of image signals corresponding to the radiation image.

By thus using a photostimulable phosphor for scintillator 6*a*, storing the radiation image temporarily, and reading out the image by laser beam scanning, the need to prepare an image pickup device of larger area is eliminated and the acquisition of a large-area radiation image, such as an image obtained for chest imaging, etc., is facilitated. Besides the abovementioned CsBr : Eu, various phosphors, such as those disclosed in JP No. 3,130,633, may be used as the photostimulable phosphor. Also, the $TiO_2$/$SiO_2$ laminate used in the first embodiment or an $HFO_2$/$SiO_2$ laminate, etc., may be used for the dielectric multilayer film mirror.

Figure 7:
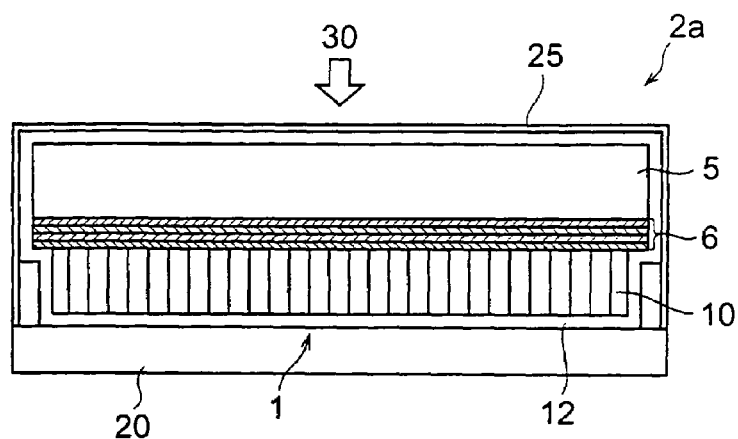
FIG. 7 and FIG. 8 are longitudinal sectional views for explaining second and third embodiments of a radiation image sensor according to the present invention.
Figure 8:
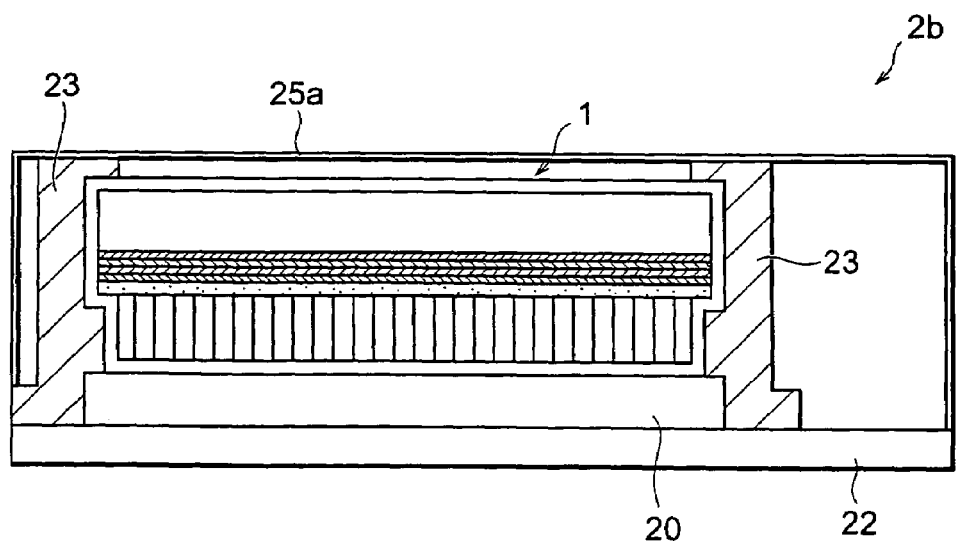
Figure 9:
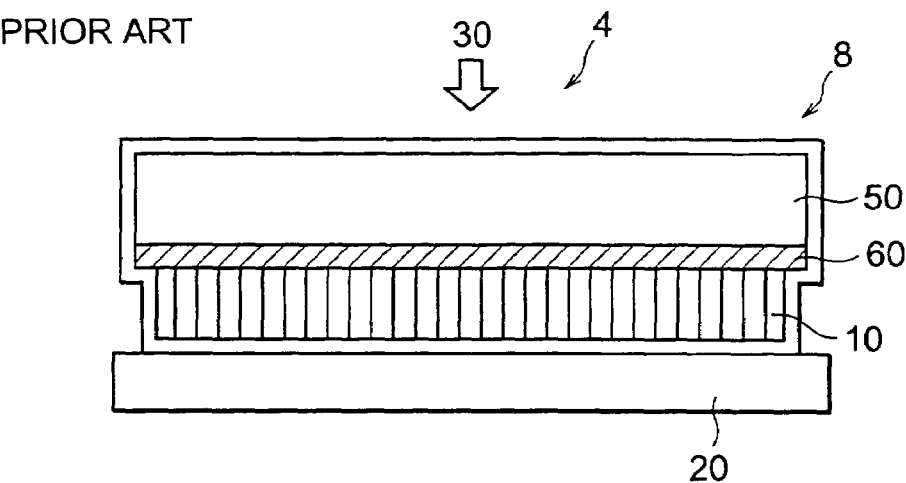
FIG. 9 and FIG. 10 are longitudinal sectional views of prior-art type radiation image sensors.
Figure 10:
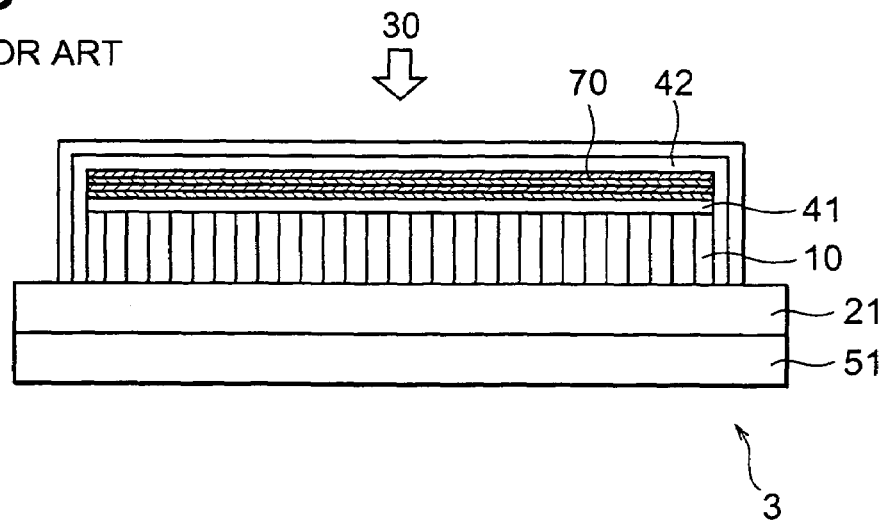

FIG. 7 is a longitudinal sectional view, showing a second embodiment of a radiation image sensor according to the present invention. With this radiation image sensor 2*a*, the radiation image sensor 2 shown in FIG. 3 is provided furthermore with a housing 25 that covers the entirety of scintillator panel 1. This housing 25 is made of a material, for example, black polycarbonate, which has a radiation transmitting property, protects the entirety, and blocks external light. Light that has been emitted by the scintillator 10 and has been transmitted through the dielectric multilayer film mirror 6 and the Pyrex glass substrate 5 is thus absorbed by the housing 25 to restrain the light from returning to a position that differs from the scintillator 10 side position from which the light was emitted and thereby restrain the degradation of resolution due to such stray light. The entry of extraneous light that acts as noise from the exterior can also be restrained and a high S/N ratio can be maintained.

Also, this housing 25 is provided in a condition where it is put in press-contact against the Pyrex glass substrate 5 of the scintillator panel 1, and the scintillator panel 1 is adhered closely to the image pickup device 20 by this press-contacting action. The occurrence of leakage of light, cross-talk, etc., in the process of recognizing the light emitted by the scintillator 10 by the image pickup device 20 can thereby be prevented. In order to realize an even higher degree of adhesion, a sponge or other elastic material may also be placed between the Pyrex glass substrate 5 and the housing 25.

As mentioned above, the use of glass as the substrate of the scintillator panel 1 provides the advantage of enabling the forming of a scintillator panel that is thin and yet will not bend. The use of a dielectric multilayer film as a light reflecting film provides the advantage of enabling the forming of a light reflecting film with excellent corrosion resistance and high reflectance. Though when a scintillator panel that incorporates both of these is formed, transmitted light, which causes lowering of contrast, will occur, with the present embodiment, this transmitted light is absorbed by the provision of the housing 25 which has a light absorbing property, thereby enabling the advantages of the two abovementioned components to be put to use while resolving the problem that occurs when the two components are used.

FIG. 6 is a longitudinal sectional view, showing a third embodiment of a radiation image sensor according to the present invention. With this embodiment (radiation image sensor 2b), an image pickup device 20 is fixed on a sensor substrate 22, on which driving and reading circuits are mounted, the image pickup device 20 is fixed in adhesion with a scintillator panel 1 by the fixing of the scintillator panel 1 onto the sensor substrate 22 by fixing jigs 23, and the entirety is covered by a housing 25 made of black polycarbonate. Since the scintillator panel 1 is adhered closely to the image pickup device 20 by the cooperative action of the fixing jigs 23 and the housing 25a, the occurrence of leakage of light, cross-talk, etc., in the process of recognizing the light emitted by the scintillator 10 by the image pickup device 20 can be prevented. Though in the Figure, there is a space between the glass substrate 5 and the housing 25a, these components may adhered together. By this structure, the occurrence of light, which, upon transmission through the Pyrex glass substrate 5, is reflected inside housing 25 and re-enters the Pyrex glass substrate 5 to give rise to the lowering of contrast and other degrading effects on the optical output, can be restrained and the lowering of the resolution and the S/N ratio can be restrained.

With regard to the housings 25 and 25a, in addition to making the housing itself from a light-absorbing member, the inner surface that contacts the Pyrex glass substrate 5 may be subject to matte furnishing, coating of a light-absorbing coat, or adhesion of a light-absorbing member.

In order to evaluate the contrast ratio of a radiation image sensor with such a housing, a sample (referred to as "Example A") of this invention's embodiment and a sample (referred to as "Comparative Example B") of a prior-art type radiation image sensor were prepared as mutually different arrangements. Besides having or not having a housing, Example A and Comparative Example B are made the same in arrangement and with both, a dielectric multilayer film mirror is formed on Pyrex glass, a scintillator of CsI is disposed on the film mirror, a polyparaxylylene film is used as the protective film, and a C-MOS type image pickup device is used as the image pickup device.

As a test for measuring the contrast ratio, radiation was irradiated upon placing a lead object of 3 cm diameter and 0.5 mm thickness on the housing, the signal values acquired by the radiation image sensor for a portion covered by the lead and for a portion exposed to radiation, respectively, were measured, and the ratio of these values was computed. As a result, in comparison to the Comparative Example B, the contrast was improved by 10% and a clearer image was acquired with the Example A.

The abovementioned test results thus confirmed that this embodiment's radiation image sensor enables the acquisition of images with sharp contrast.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The scintillator panel and radiation image sensor according to the present invention can be used favorably for chest imaging and other medical uses as well as for non-destructive inspection and other industrial applications.

The invention claim is:

1. A scintillator panel comprising:
a heat-resistant substance;
a dielectric multilayer film mirror, deposited on said heat-resistant substrate;
a scintillator, deposited so as to arrange a plurality of columnar structures on said dielectric multilayer film mirror and converting incident radiation into light and emitting this light; and
a protective film, covering at least said scintillator; wherein
said dielectric multilayer film mirror reflects light emitted from said scintillator and returns this light toward said scintillator, and said scintillator panel further comprising:
a separation preventing layer, which prevents the separation of said scintillator from said dielectric multilayer film mirror, disposed between said dielectric multilayer film mirror and said scintillator.

2. A scintillator panel comprising:
a radiation transmitting substrate with heat resistance;
a dielectric multilayer film mirror, formed on said radiation transmitting substrate;
a scintillator, deposited so as to arrange a plurality of columnar structures on said dielectric multilayer film mirror and converting radiation, which as entered said radiation transmitting substrate and has passed through said dielectric multilayer film mirror, into light and emitting this light; and
a protective film, covering at least said scintillator; wherein
said dielectric multilayer film mirror reflects light emitted from said scintillator and returns this light toward said scintillator, and said scintillator panel further comprising:
a separation preventing layer, which prevents the separation of said scintillator from said dielectric multilayer film mirror, disposed between said dielectric multilayer film mirror and said scintillator.

3. The scintillator panel according to claim 1 or 2, wherein said scintillator has CsI or NaI as the main component.

4. The scintillator panel according to claim 1, wherein the scintillator is a photostimulable phosphor.

5. The scintillator panel according to any of claims 1 to 2, wherein said protective film is an organic film.

6. The scintillator panel according to any of the claims 1 to 2, wherein said dielectric multilayer film mirror is a multilayer film having laminated structure with alternating $TiO_2$ or $Ta_2O_5$ and $SiO_2$ layers.

7. The scintillator panel according to any of claims 1 to 2, wherein the separation preventing layer is a polyimide layer.

8. A radiation image sensor comprising: the scintillator panel according to any of claims 1 to 2; and an image pickup device, disposed so as to face said scintillator panel and converting the light emitted by said scintillator to electrical signals.

9. The radiation image sensor according to claim 8, further comprising a light-absorbing housing that covers said scintillator panel.

10. The radiation image sensor according to claim 9, wherein said housing is made of polycarbonate.

11. The radiation image sensor according to claim 9, wherein the inner surface of said housing is matte finished.

12. The radiation image sensor according to claim 9, further comprising a fixing jigs that fix the scintillator panel in adhesion with said image pickup device.

13. A method for making a scintillator panel comprising the steps of:

preparing a heat-resistant substrate;

repeatedly depositing a dielectric film of desired thickness onto said substrate to form a dielectric multilayer film mirror with predetermined reflection characteristics;

forming a separation preventing layer for preventing a separation of a scintillator which is formed by subsequent step;

depositing columnar structures of scintillator on said separation preventing layer; and coating the scintillator with a protective film.

14. A method for making a radiation image sensor comprising the step of positioning an image pickup device so as to face the scintillator subsequent the steps of claim 13.

15. The method for making the radiation image sensor according to claim 14, further comprising the step of covering the scintillator panel with a light-absorbing housing subsequent the steps of claim 14.

* * * * *